No. 769,463. PATENTED SEPT. 6, 1904.
E. BLANCHARD.
MASSAGE ROLLER.
APPLICATION FILED DEC. 16, 1903.
NO MODEL.
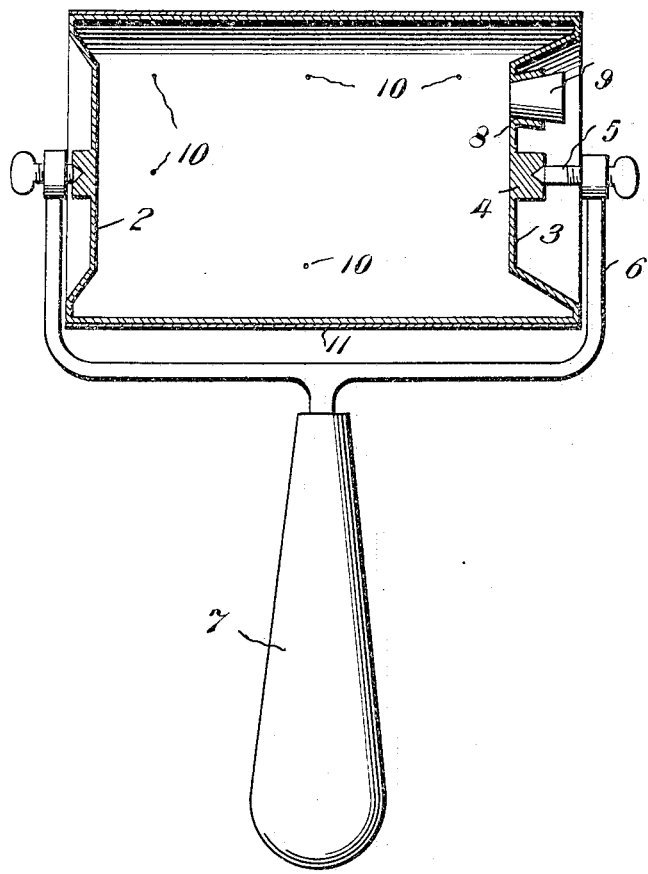
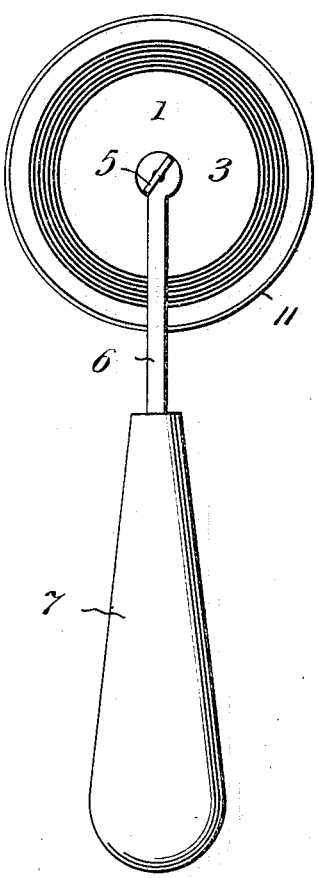
WITNESSES:
INVENTOR
Elmer Blanchard.
BY
Victor J. Evans, Attorney No. 769,463.

Patented September 6, 1904.

UNITED STATES PATENT OFFICE.

ELMER BLANCHARD, OF COOPERSVILLE, MICHIGAN.

MASSAGE-ROLLER.

SPECIFICATION forming part of Letters Patent No. 769,463, dated September 6, 1904.

Application filed December 16, 1903. Serial No. 185,371. (No model.)

*To all whom it may concern:*

Be it known that I, ELMER BLANCHARD, a citizen of the United States, residing at Coopersville, in the county of Ottawa and State of Michigan, have invented new and useful Improvements in Massage-Rollers, of which the following is a specification.

My invention relates to new and useful improvements in massage implements; and the principal object is to provide a roller for the reception of suitable fluids adapted to be brought into contact with the flesh of the person upon whom the roller is used.

With the above and other objects in view the invention consists of a hollow roller having an inlet, and this roller is fulcrumed within a yoke to which is connected a handle. Minute apertures are formed within the roller, and said roller is provided with a soft absorbent covering adapted to receive liquid discharged from the apertures and apply it to the surface upon which the roller is used.

The invention also consists in the novel construction and arrangement of the several parts, which will be more fully hereinafter set forth.

In the drawings, Figure 1 is a section through my improved massage-roller, and Fig. 2 is an end elevation thereof.

Referring to the figures by numerals of reference, 1 is a hollow roller, preferably formed of metal and having depressed ends 2 and 3, each of which is provided with a centrally-arranged enlargement 4, which forms a bearing for a set-screw 5. The two set-screws are adjustably mounted in the ends of a yoke 6, having a handle 7 secured thereto. An inlet 8 is formed in one of the ends of the roller and is normally closed by a plug 9 or in any other suitable manner. Minute apertures 10 are formed in the roller, and said roller is inclosed by a cover 11, formed of felt, chamois, or other soft absorbent material.

In using the device herein described a suitable liquid is placed within the roller, after which the closure 9 is fitted within the inlet 8. The roller is then moved backward and forward over the portion of the body to be treated and the soft covering 11 absorbs the moisture discharged from the apertures 10 and transfers it to the treated surface. It will be understood that hot or cold water, medicated liquid, or liquid perfume may be used in connection with this device, and in addition to the kneading or working of the flesh produced by the roller the liquid contents of the device are applied to the flesh to produce a predetermined result.

The implement is very simple and inexpensive in construction, compact, and can be readily used for the purposes intended.

While I have shown a roller of cylindrical form, it will be understood that any desired contour may be utilized.

In the foregoing description I have shown the preferred form of my invention; but I do not limit myself thereto, as I am aware that modifications may be made therein without departing from the spirit of the invention, and I therefore reserve the right to make all such changes as fairly fall within the scope of my invention.

Having thus fully described the invention, what is claimed as new is—

1. In an implement of the character described, the combination with a yoke having a handle thereon; of a roller detachably mounted and journaled within the yoke and having a normally closed inlet at one end and apertures in the working face thereof, and an absorbent cover upon the working face of the roller.

2. An implement of the character described, comprising a yoke and a handle connected thereto, a hollow roller arranged within the yoke and having a normally closed inlet, the working face of said roller being provided with apertures, adjustable bearings within the yoke and engaging the roller, and a soft absorbent cover upon the working face of the roller.

3. In an implement of the character described, the combination with a hollow roller having an inlet, and an apertured working face; of an absorbent covering extending over the apertured portion of the roller.

In testimony whereof I affix my signature in presence of two witnesses.

ELMER BLANCHARD.

Witnesses:
CHAS. M. MOORE,
CLOIE DURHAM.